(12) United States Patent  (10) Patent No.: US 7,765,872 B2
Morales et al.  (45) Date of Patent: Aug. 3, 2010

(54) FLOW SENSOR APPARATUS AND METHOD WITH MEDIA ISOLATED ELECTRICAL CONNECTIONS

(75) Inventors: Gilberto Morales, Arlington, TX (US); Carl Stewart, Plano, TX (US); Scott Edward Beck, Murphy, TX (US); Richard Alan Davis, Plano, TX (US)

(73) Assignee: Honeywell International Inc., Morristown, NJ (US)

( * ) Notice: Subject to any disclaimer, the term of this patent is extended or adjusted under 35 U.S.C. 154(b) by 64 days.

(21) Appl. No.: 12/273,912

(22) Filed: Nov. 19, 2008

(65) Prior Publication Data

US 2010/0122580 A1   May 20, 2010

(51) Int. Cl.
    *G01L 7/00* (2006.01)
(52) U.S. Cl. ....................................................... 73/706
(58) Field of Classification Search . 73/861.42–861.47, 73/706, 715
    See application file for complete search history.

(56) References Cited

U.S. PATENT DOCUMENTS

| | | | |
|---|---|---|---|
| 4,380,932 A | 4/1983 | Mott et al. | 73/749 |
| 5,244,179 A * | 9/1993 | Wilson | 251/30.03 |
| 5,684,253 A | 11/1997 | Bonne et al. | 73/706 |
| 5,996,419 A | 12/1999 | Sokn | 73/706 |
| 6,959,607 B2 | 11/2005 | Wilda | 73/716 |
| 7,010,984 B2 | 3/2006 | Krog et al. | 73/716 |
| 7,162,927 B1 | 1/2007 | Selvan et al. | 73/753 |
| 7,219,551 B2 | 5/2007 | Suzuki | 73/718 |
| 2006/0142634 A1 | 6/2006 | Anstadt et al. | 600/16 |
| 2006/0169048 A1 | 8/2006 | Suzuki | 73/716 |
| 2006/0260408 A1 | 11/2006 | Villa et al. | 73/715 |
| 2007/0044865 A1 | 3/2007 | Ruesch et al. | 141/301 |
| 2007/0114624 A1 | 5/2007 | Kurtz et al. | 257/419 |

* cited by examiner

*Primary Examiner*—Jewel Thompson

(57) ABSTRACT

A flow sensor apparatus that utilizes a pressure sensor with media isolated electrical connections. A cap can be attached to topside of the pressure sensor over a diaphragm to protect bond pads and wire bonds from a fluid media. A flow channel can be etched on the cap with an opening and exit on the sides of the cap so that liquid can flow through the flow channel. An inlet port and an outlet port can be attached to the channel's opening and exit to allow for fluid flow over the diaphragm. The flow channel creates a larger pressure over portions of the diaphragm that increases the deflection of the diaphragm, which increases an output signal of the pressure sensor. V-grooves can be created on two sides of the pressure sensor and in the cap to create the channel for the fluid in and out of the cap's cavity.

20 Claims, 7 Drawing Sheets

FLOW SENSOR APPARATUS AND METHOD WITH MEDIA ISOLATED ELECTRICAL CONNECTIONS

TECHNICAL FIELD

Embodiments are generally related to sensor methods and systems. Embodiments are also related to flow sensing methods that utilize pressure sensors. Embodiments are additionally related to flow sensor devices that incorporate the use of media-isolated electrical connections.

BACKGROUND OF THE INVENTION

Flow sensors can be utilized in many different applications, such as in industrial process control environments, to measure flow rates of process fluids (e.g., liquids and gases) and provide flow signals for flow indicators, controls, and flow volume metering. In majority of micro bridge flow sensors, the open nature of the micro bridge structure can result in condensation from vapor being retained in the micro bridge structure leading to uncontrolled changes in thermal response making the sensor measurements susceptible to error and instability. The measurement of flow rate exposes metal pads and wire bonds to the fluid, which can create a harsh environment for the exposed bond pads and lead to possible corrosion, especially for aluminum, which is a common metal in the semiconductor industry and long-term reliability failures.

Furthermore, wires bonded to heater and sensing elements retain particles suspended in the fluid and increase turbulence shifting flow response. Also, wire bonds are in the path of the flow can interfere with an accurate measurement of the flow being sensed by the sensor. Hence, it is desirable to isolate sensing elements, metal pads, wire bonds and electrical connections from direct contact with the fluids for reliable operation. Some prior art devices have attempted to solve this problem utilizing a micro bridge with a cap wafer applied over the sensor element to isolate the wire bonds. Such flow sensors are fragile and susceptible to damage from higher flow rates or handling. Also, the flow path associated with such devices decreases the pressure created by the fluid flow, which provides lesser sensitivity for the sensor.

A need, therefore, exists for an improved robust flow sensor apparatus with high reliability, which can provide media isolated electrical connections. Further, a need also exists for an improved flow channel, which increases the pressure created by the fluid flow, and provides greater sensitivity for the sensor. Such flow sensors are described in greater detail herein.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved flow pressure sensor with a cap that can overcome the aforementioned drawbacks.

It is another aspect of the present invention to provide for an improved flow sensor apparatus with media isolated electrical connections.

It is a further aspect of the present invention to provide for an improved flow channel that provides greater sensitivity for the flow sensor.

The aforementioned aspects and other objectives and advantages can now be achieved as described herein. A flow sensor apparatus that utilizes a pressure sensor with media isolated electrical connections is disclosed. A cap can be attached to the topside of the pressure sensor over a diaphragm to protect bond pads and wire bonds from a fluid media. A flow channel can be etched on the cap with an opening and exit on the sides of the cap so that liquid can flow through the flow channel. An inlet port and an outlet port can be attached to the channel's opening and exit to allow for fluid flow over the diaphragm. The flow channel creates a larger pressure over portions of the diaphragm that increases the deflection of the diaphragm, which increases an output signal of the pressure sensor. V-grooves can be created on two sides of the pressure sensor and in the cap to create the channel for the fluid in and out of the cap's cavity.

The V-grooves create two cavities between the pressure sensor and the cap when the cap is attached to it. A tube can be fixed to these cavities with some sort of attach material in order to form the flow channel. The fluid flows through one port into the cap's cavity and out the other port. Furthermore, the channel in the cap can be etched in order to increase the fluid pressure as it flows through the channel. The cap can be attached to the top side of an absolute and/or gage pressure sensor. Flow rate can be measured by flowing the fluid over the pressure sensor diaphragm. As the fluid flows over the pressure sensor, it creates a pressure proportional to the flow rate. The change in pressure deflects the diaphragm creating an output signal proportional to the flow rate.

Different channel geometries such as rectangular channel, venturi and thinner trailing section can be provided over the pressure sensor to produce different stresses on the diaphragm. The channel geometry can be created in such a way that it creates a larger pressure over portions of the diaphragm that increases the diaphragm's deflection. Such increased deflection increases the output signal of the pressure sensor. The flow sensor apparatus provides for a more robust sensor, as the pressure sensor diaphragms are stronger and less susceptible to damage from the fluid being sensed or from the manufacturing process.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1A:
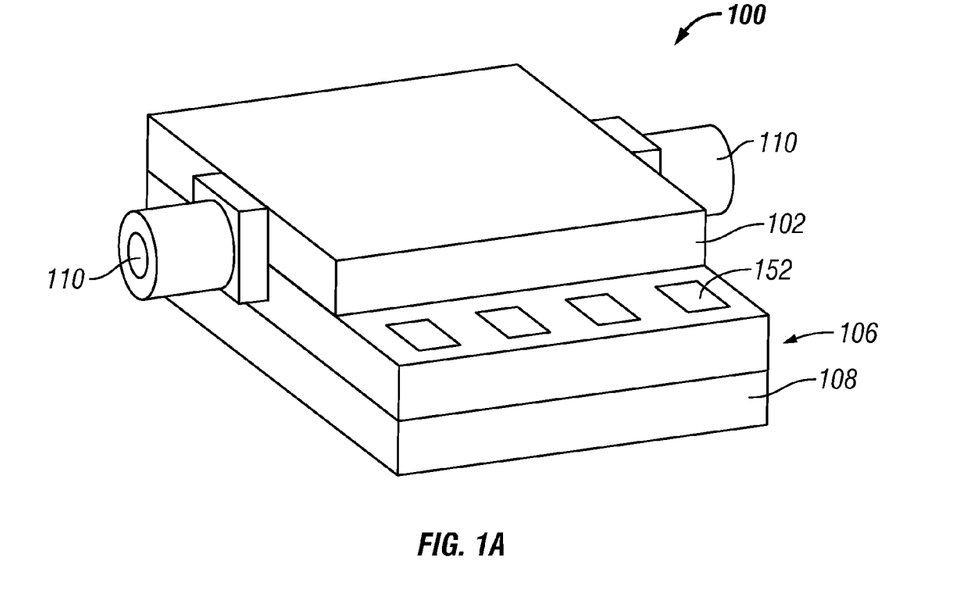
FIG. 1A illustrates a perspective view of a flow sensor apparatus with ports on sides of a top cap attached to a pressure sensor, in accordance with a preferred embodiment.
Figure 1B:
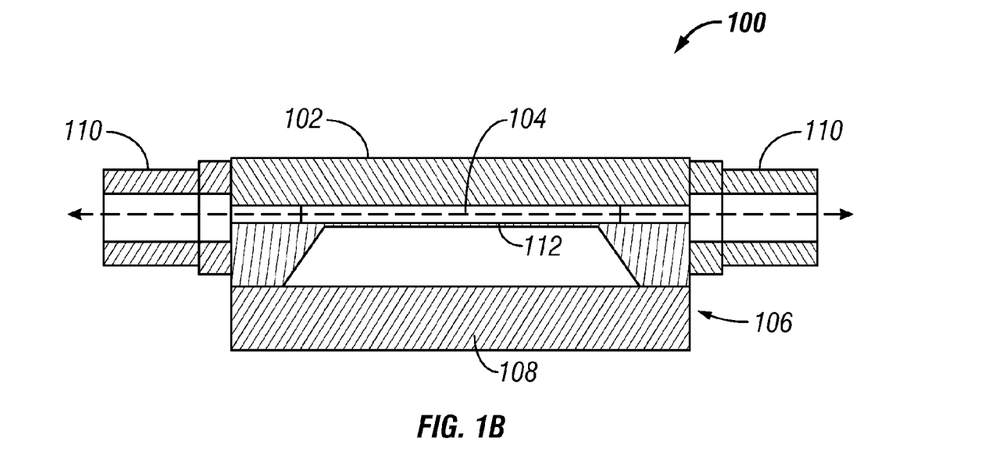
FIG. 1B illustrates a cross sectional view of the flow sensor apparatus with ports on sides of the top cap attached to the pressure sensor, in accordance with a preferred embodiment.

FIG. 1A illustrates a perspective view of a flow sensor apparatus 100 with ports on sides of a top cap 102 attached to a pressure sensor 106, in accordance with a preferred embodiment. The pressure sensor 106 generally includes a diaphragm 112 attached to a backing plate 108, as shown in FIG. 1B. A cap 102 can be attached to the topside of the pressure sensor 106. A channel 104, as shown in FIG. 1B, can be etched or machined on the cap 102 in order to create a path for fluid flow. The opening and exit of the channel 104 are on the sides of the cap 102. An inlet port and an outlet port 110 can be attached to the opening and exit of the channel 104. The inlet port and the outlet port 110 can be utilized for allowing fluid to pass through therein. Note that as utilized herein the term "fluid" can refer to a gas and/or a liquid. The fluid flow over the pressure sensor 106 creates a pressure proportional to the flow rate. The pressure deflects the diaphragm 112 creating an output signal proportional to the flow rate.

FIG. 1B illustrates a cross-sectional view of the flow sensor apparatus 100 with ports 110 on sides of the top cap 102 attached to a pressure sensor 106, in accordance with a preferred embodiment. Note that in FIGS. 1-7, identical or similar parts are generally indicated by identical reference numerals. The pressure sensor 106 includes bond pads 152, as shown in FIG. 1A, that provide an external electrical connection for the diaphragm 112. Such bond pads 152 can preferably configured, for example, from aluminum. As shown in FIG. 1A and FIG. 1B, the cap 102 keeps the fluid away from bond pads 152.

The fluid can be applied through the inlet port and the outlet port 110 attached to the opening in the cap 102 such that the fluid path is not exposed to the bond pads 152. The channel 104 can be formed as a passage through the cap 102. The fluid to be measured can be passed through the ports 110 associated with the channel 104. The cap 102 can seal the media from the bond pads 152 in order to avoid creation of harsh environment for the exposed bond pads 152. Thus, the flow sensor apparatus 100 can result in long-term reliability and accuracy in the fluid flow sensing.

Figure 2A:
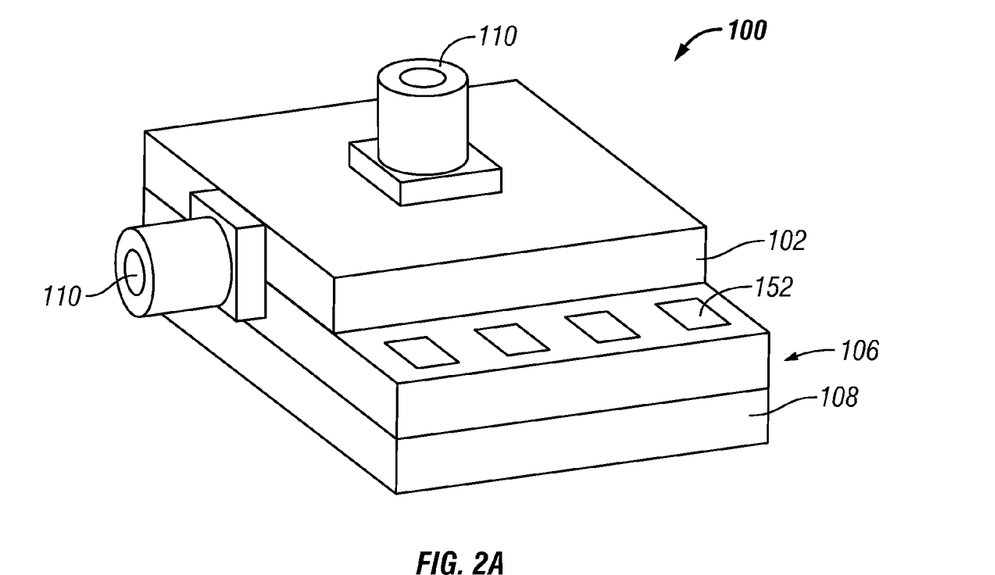
FIG. 2A illustrates a perspective view of the flow sensor apparatus with ports on cap's top and side, in accordance with a preferred embodiment.
Figure 2B:
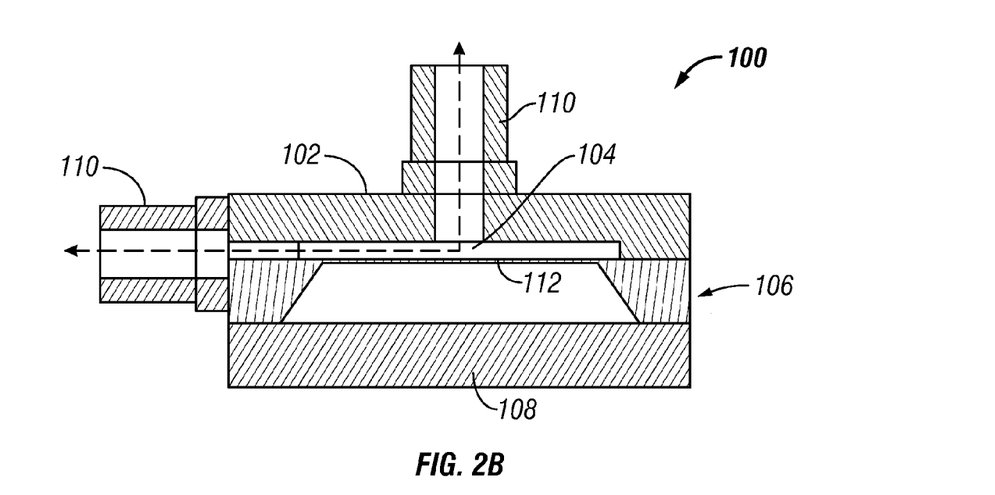
FIG. 2B illustrates a cross sectional view of the flow sensor apparatus with ports on cap's top and side, in accordance with a preferred embodiment.

FIG. 2A and FIG. 2B illustrates a perspective view and a cross-sectional view of the flow sensor apparatus 100 with ports 110 on top and side of the cap 102, in accordance with a preferred embodiment. The diaphragm 112 can be placed on the bottom side of the cap 102 and formed on the upper surface of the backing plate 108 utilizing well-known semiconductor fabrication technologies. The diaphragm 112 can further include a predetermined diaphragm thickness and length. As shown in FIG. 2A and FIG. 2B, one opening can be created on the top of the cap 102 and the other can be created on the side of the cap 102. The inlet and outlet port 110 can be attached to the opening created on the cap 102. The cap 102 can be fabricated in such a way that both the inlet outlet ports 110 allow the fluid flow over the diaphragm 112. The flow rate can be measured by flowing the fluid over the pressure sensor's diaphragm 112. The change in pressure created by the fluid flow deflects the diaphragm 112 creating an output signal on the pressure sensor 106. The cap 102 can seal the media from the bond pads 152 in order to avoid creation of harsh environment for the exposed bond pads 152.

Figure 3A:
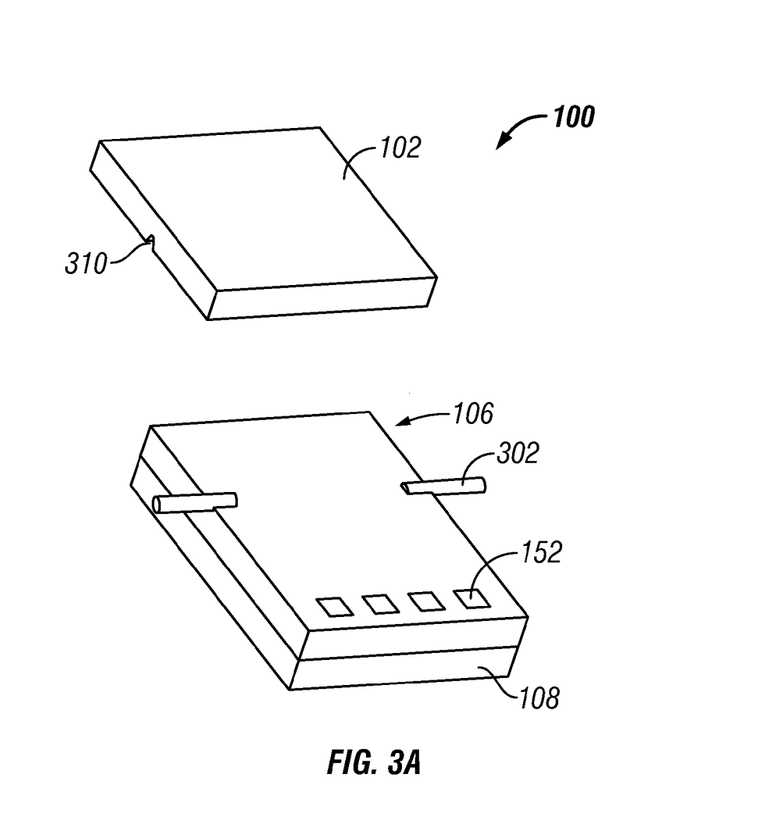
FIG. 3A illustrates a perspective view of the flow sensor apparatus with tubes attached to V-grooves on the pressure sensor, in accordance with an alternative embodiment.
Figure 3B:
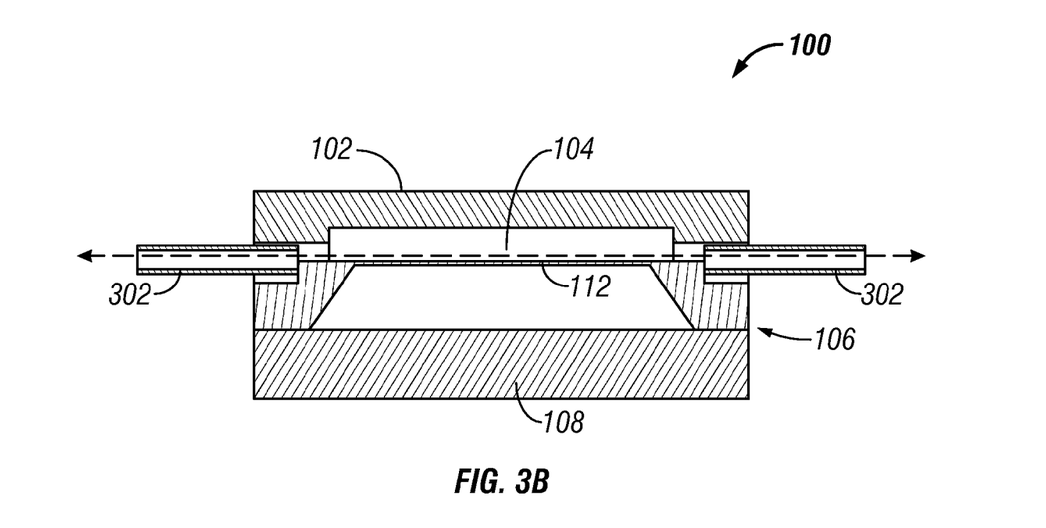
FIG. 3B illustrates a cross sectional view of the flow sensor apparatus with tubes attached to V-grooves on the pressure sensor, in accordance with an alternative embodiment.

FIG. 3A and FIG. 3B illustrates a perspective view and a cross-sectional view of the flow sensor apparatus 100 with tubes 302 attached to V-grooves 310 on the pressure sensor 106, in accordance with a preferred embodiment. A V-groove 310 can be created on two sides of the pressure sensor 106. The V-grooves 310 can also be created in the cap 102 to create a path for the fluid in and out of the cap's cavity. The V-grooves 310 creates two cavities between the pressure sensor 106 and the cap 102 when the cap 102 is attached to it. A tube 302 can be fixed to the cavities with some sort of attach material in order to form a flow channel. The fluid flows through one end of the tube 302 into the cap's cavity and out the other end of the tube 302. As the fluid flows over the pressure sensor 106, it creates a pressure proportional to the flow rate. This allows the pressure sensor 106 to be utilized as a flow sensor. The fluid flow is kept isolated from the metal pads and/or wire bonds 152. Electrical signals of the bond pads 152 can be routed under the cap 102. The cap 102 can completely seal the bond pads 152 from the harsh media in order to provide media isolated electrical connections. Thus, the flow sensor apparatus 100 utilizing pressure sensor 106 can provide a highly reliable sensing output.

Figure 4A:
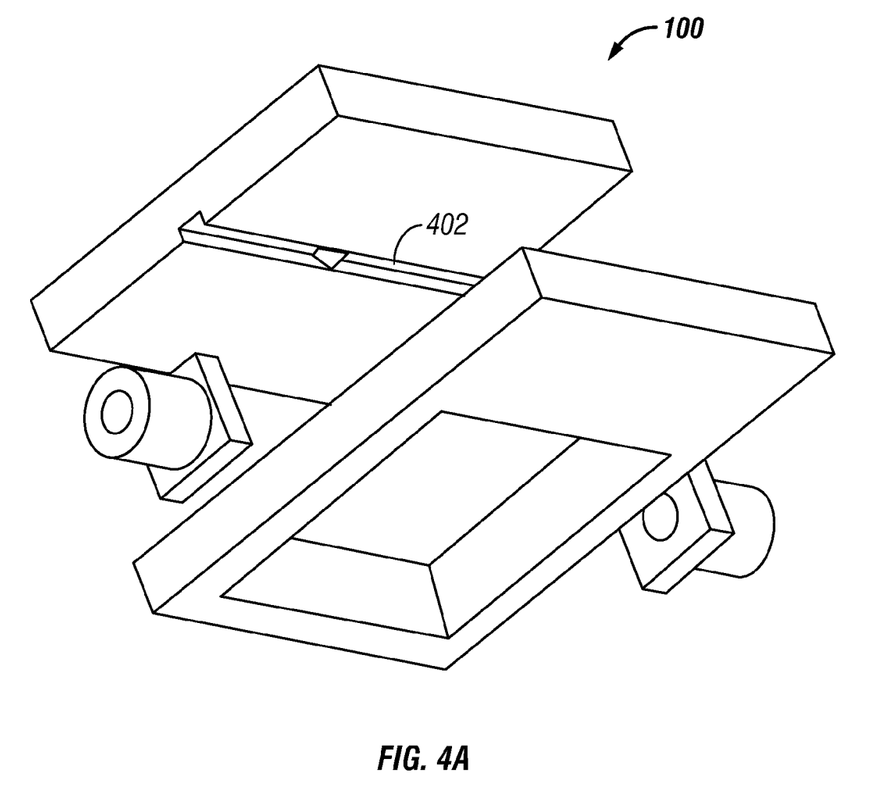
FIG. 4A illustrates a perspective view of the flow sensor apparatus with an etched flow channel and ports on cap sides, in accordance with a preferred embodiment.
Figure 4B:
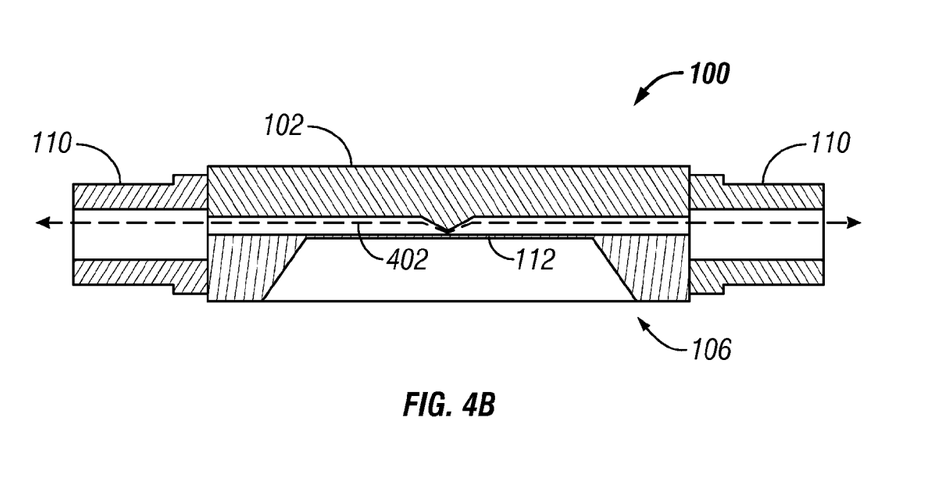
FIG. 4B illustrates a cross sectional view of the flow sensor showing the etched flow channel in the cap, in accordance with a preferred embodiment.

FIG. 4A illustrates a perspective view of the flow sensor apparatus 100 with an etched fluid channel 402 and ports 110 on sides of the cap 102, in accordance with a preferred embodiment. Again as reminder, in FIGS. 1-7, identical or similar parts are generally indicated by identical reference numerals. As shown in FIG. 4B, the fluid channel 402 can be etched on the cap 102 so that the channel 104 increases the fluid pressure as the fluid flow through it. The etched fluid channel 402 creates a larger pressure over portions of the diaphragm 112 that increases the deflection of the diaphragm 110. This increased deflection increases the output signal of the pressure sensor 106.

Figure 5A:
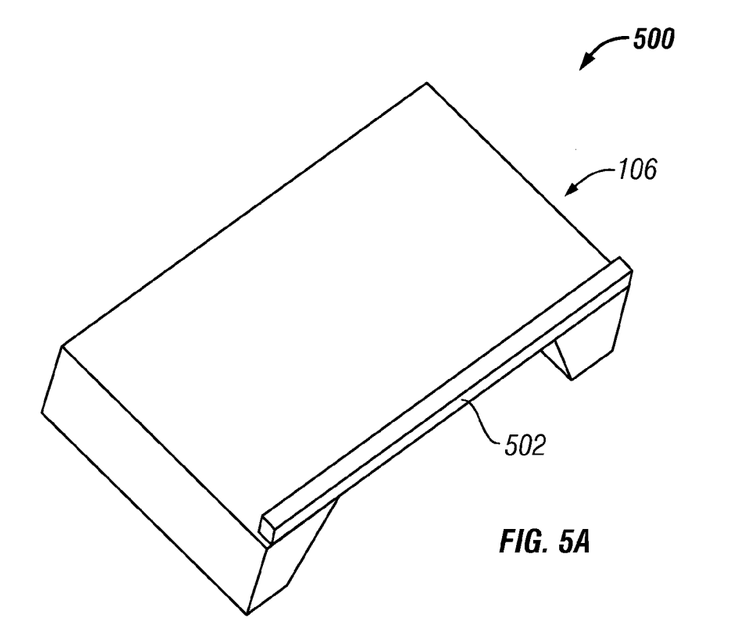
FIGS. 5A-5D illustrate channel geometry over the pressure sensor diaphragm, in accordance with a preferred embodiment.
Figure 5B:
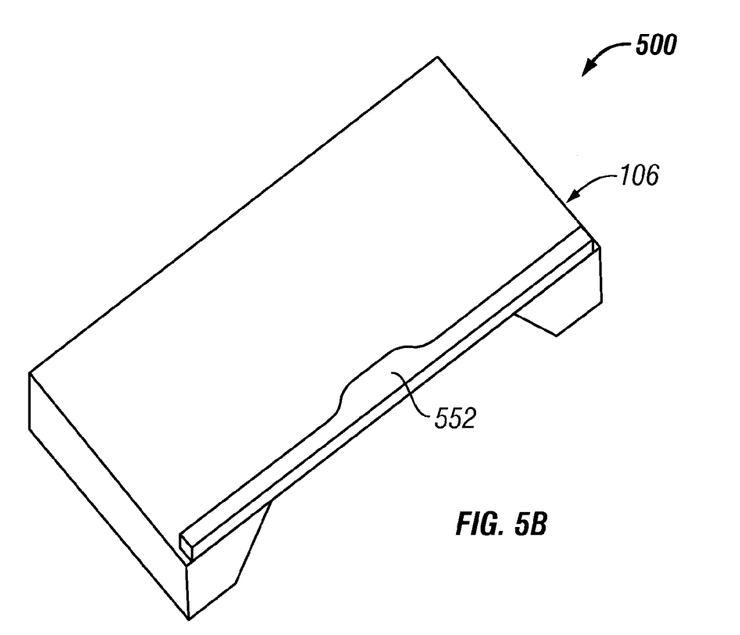
Figure 5C:
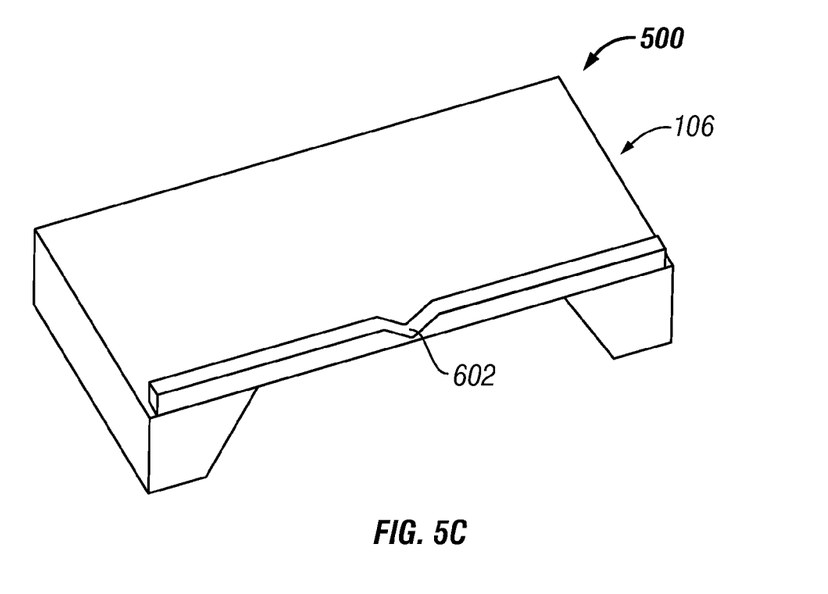
Figure 5D:
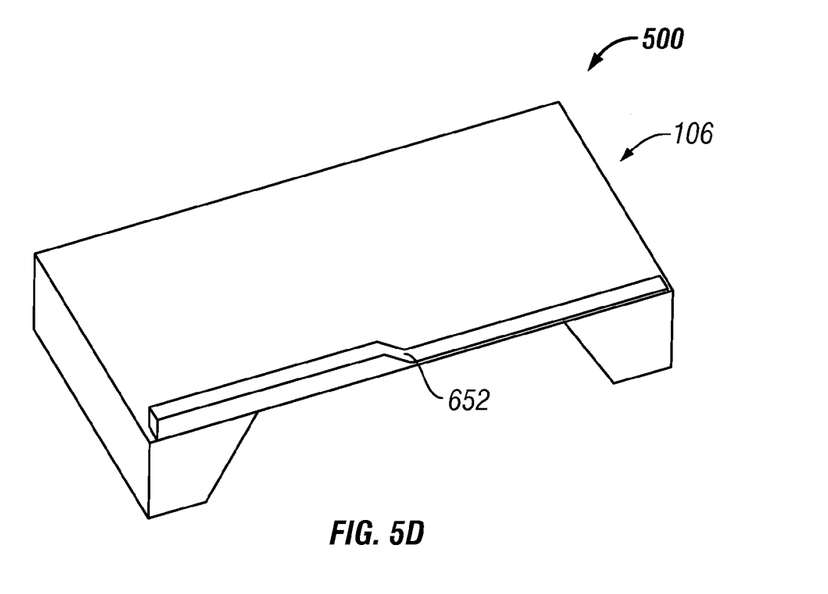

FIG. 5A illustrates channel geometry 500 with rectangular channel 502 over the pressure sensor diaphragm 112, in accordance with a preferred embodiment. Different channel geometries over the pressure sensor 106 produce different stresses on the diaphragm 112. The channel geometry can be created in such a way that it creates a larger pressure over portions of the diaphragm 112 that increases the diaphragm's deflection. Note that the embodiments discussed herein should not be construed in any limited sense. It can be appreciated, of course, that other channel geometries can be incorporated over the pressure sensor's diaphragm 112 as desired without departing from the scope of the invention. FIG. 5B illustrates channel geometry 500 with a larger section 552 over the center of the pressure sensor diaphragm 112. Similarly, FIG. 5C illustrates channel geometry 500 with a venturi 602 over the center of the pressure sensor diaphragm 112 and FIG. 5D illustrates channel geometry 500 with thinner trailing section 652.

Figure 6:
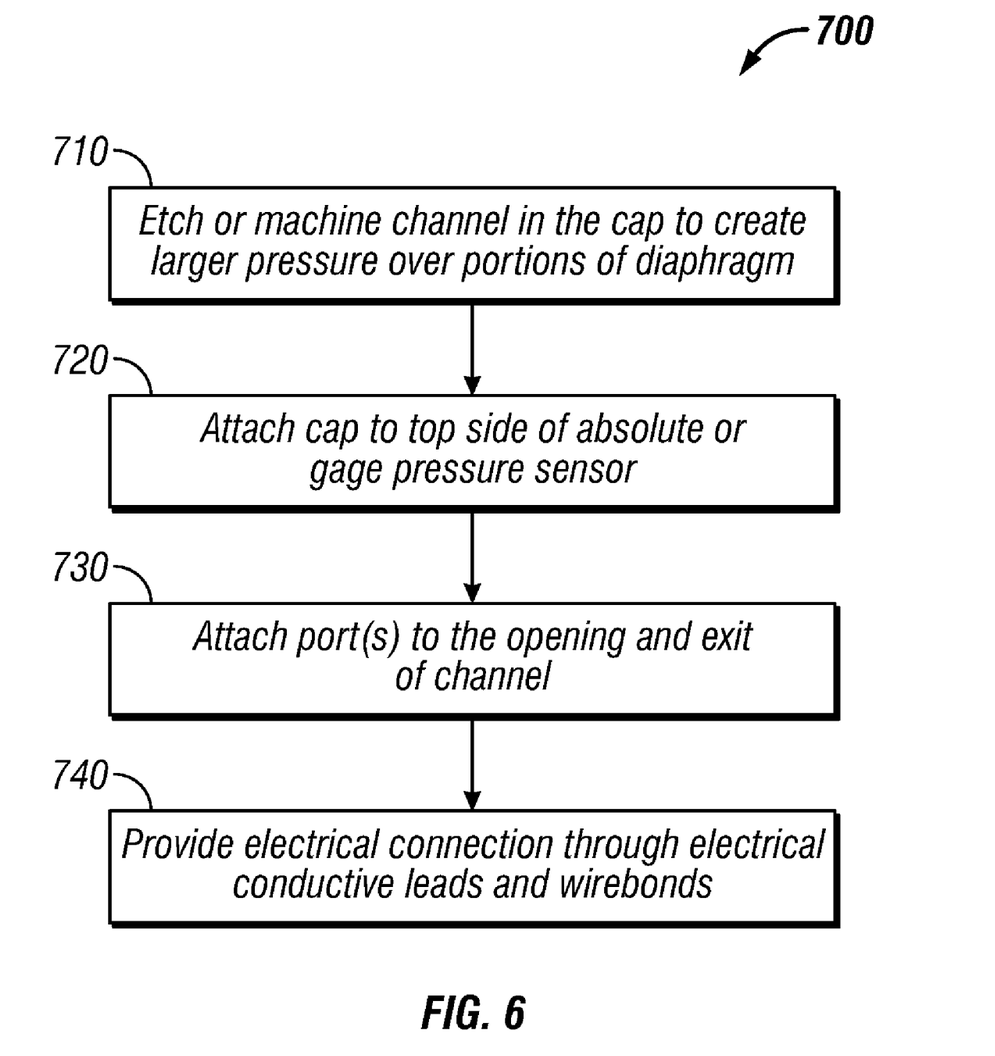
FIG. 6 illustrates a high level flow chart of operations illustrating logical operational steps of a method for designing a flow sensor apparatus with media isolated electrical connections, in accordance with a preferred embodiment.

FIG. 6 illustrates a high level flow chart of operations illustrating logical operational steps of a method 700 for designing the flow sensor apparatus 100 with media isolated electrical connections, in accordance with a preferred embodiment. The channel 104 in the cap 102 can be etched or machined in such a way that it creates a larger pressure over portions of the diaphragm 112, as depicted at block 710. Cap 102 can be attached to the topside of the pressure sensor 106, as depicted at block 720. Thereafter, as illustrated at block 730, ports 110 can be attached to the channel's opening and exit. The fluid to be measured can be applied over the pressure sensor's diaphragm 112 utilizing the inlet and outlet ports 110. Thereafter, electrical connections can be provided through conductive leads and bond pads 152, as depicted at block 740. The flow rate can be measured through the output signal on the pressure sensor 106.

The channel can be formed by creating V-grooves 310 on the sides of the pressure sensor 106 and the cap 102 in order to form a cavity and attaching the tube 302 on the cavity. Electronic systems utilized for obtaining measurements from the flow sensor apparatus 100 for further analysis and recording are well known to those skilled in the art. Such flow sensor apparatus 100 can utilize the cap 102 to prevent the topside of the sensor 106, in particular bond pads 152, from the harsh or corrosive media, which provides a more robust and reliable sensing output. The disclosed approach also provides for a more robust flow sensor 100, as the pressure sensor diaphragms are stronger and less susceptible to damage from the fluid being sensed or from the manufacturing process.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A flow sensor apparatus, comprising:
a cap attached to a topside of a pressure sensor and above a diaphragm in order to protect a plurality of components associated with said pressure sensor from a fluid;
a flow channel configured on said cap with an opening and an exit on at least one side of said cap so that said fluid can flow through said flow channel; and
an inlet port and an outlet port attached to said opening and said exit of said flow channel to allow said fluid to flow over said diaphragm, wherein said flow channel creates a larger pressure over portions of said diaphragm which in turn increases a deflection of said diaphragm and further increases an output signal of said pressure sensor.

2. The apparatus of claim 1 wherein said plurality of components comprises bond pads.

3. The apparatus of claim 1 wherein said plurality of components comprises wire bonds.

4. The apparatus of claim 1 wherein said pressure sensor comprises an absolute pressure sensor.

5. The apparatus of claim 1 wherein said pressure sensor comprises a gage pressure sensor.

6. The apparatus of claim 1 wherein said flow channel further comprises:
a V-groove configured on two sides of said pressure sensor and in said cap in order to form a cavity between said pressure sensor and said cap; and
a tube attached to said cavity to form said flow channel in order for said fluid to flow.

7. The apparatus of claim 1 wherein said flow channel is etched on said cap with respect to said opening and said exit on a top and a side of said cap.

8. The apparatus of claim 1 wherein said fluid passes through said opening of said cap such that a fluid path thereof is not exposed to said plurality of components.

9. The apparatus of claim 1 wherein said diaphragm is deformed in accordance with a pressure applied by said fluid.

10. The apparatus of claim 1 wherein said flow channel further comprises:
a plurality of channel geometries configured over said pressure sensor to create a larger pressure with respect to portions of said diaphragm that increase said deflection of said diaphragm.

11. A flow sensor apparatus, comprising:
a cap attached to a topside of a pressure sensor and above a diaphragm in order to protect a plurality of components associated with said pressure sensor from a fluid;
a flow channel etched or machined on said cap with an opening and an exit on at least one side of said cap so that said fluid can flow through said flow channel; and
an inlet port and an outlet port attached to said opening and said exit of said flow channel to allow said fluid to flow over said diaphragm, wherein said flow channel creates a larger pressure over portions of said diaphragm which in turn increases a deflection of said diaphragm and further increases an output signal of said pressure sensor, wherein said flow channel is etched on said cap with respect to said opening and said exit on a top and a side of said cap and wherein said fluid passes through said opening of said cap such that a fluid path thereof is not exposed to said plurality of components.

12. The apparatus of claim 11 wherein said pressure sensor comprises an absolute pressure sensor.

13. The apparatus of claim 11 wherein said pressure sensor comprises a gage pressure sensor.

14. The apparatus of claim 11 wherein said flow channel further comprises:
a V-groove configured on two sides of said pressure sensor and in said cap in order to form a cavity between said pressure sensor and said cap; and
a tube attached to said cavity to form said flow channel in order for said fluid to flow.

15. A method for configuring a flow sensor apparatus, comprising:
attaching a cap to a topside of a pressure sensor and above a diaphragm in order to protect a plurality of components associated with said pressure sensor from a fluid;
forming a flow channel on said cap with an opening and an exit on at least one side of said cap so that said fluid can flow through said flow channel; and
attaching an inlet port and an outlet port to said opening and said exit of said flow channel to allow said fluid to flow over said diaphragm, wherein said flow channel creates a larger pressure over portions of said diaphragm which in turn increases a deflection of said diaphragm and further increases an output signal of said pressure sensor.

16. The method of claim 15 wherein said plurality of components comprises bond pads.

17. The method of claim 15 wherein said plurality of components comprises wire bonds.

18. The method of claim 15 further comprising configuring said flow channel to comprise:
a V-groove formed on two sides of said pressure sensor and in said cap in order to form a cavity between said pressure sensor and said cap; and
a tube attached to said cavity to form said flow channel in order for said fluid to flow.

19. The method of claim 15 further comprising:
configuring said flow channel on said cap with respect to said opening and said exit on a top and a side of said cap, wherein said fluid passes through said opening of said cap such that a fluid path thereof is not exposed to said plurality of components and wherein said diaphragm is deformed in accordance with a pressure applied by said fluid.

20. The method of claim 15 further comprising configuring said flow channel to include a plurality of channel geometries configured over said pressure sensor to create a larger pressure with respect to portions of said diaphragm that increase said deflection of said diaphragm.

* * * * *